United States Patent
Pecher et al.

(10) Patent No.: US 11,332,066 B2
(45) Date of Patent: May 17, 2022

(54) VEHICLE BODY COMPONENT, METHOD FOR MANUFACTURING A VEHICLE BODY COMPONENT AND METHOD FOR OPERATING A LIGHTING MEANS ARRANGEMENT

(71) Applicant: vosla GmbH, Plauen (DE)

(72) Inventors: Markus Pecher, Aue (DE); Lutz Pötzschner, Weischlitz (DE); Matthias Böttcher, Wohlhausen (DE); Markus Winkler, Tauberbischofsheim (DE)

(73) Assignee: vosla GmbH, Plauen (DE)

( * ) Notice: Subject to any disclaimer, the term of this patent is extended or adjusted under 35 U.S.C. 154(b) by 0 days.

(21) Appl. No.: 16/774,148

(22) Filed: Jan. 28, 2020

(65) Prior Publication Data
US 2021/0229596 A1    Jul. 29, 2021

(30) Foreign Application Priority Data
Jan. 24, 2020    (DE) .............. 20 2020 000 304.2

(51) Int. Cl.
*B60Q 1/26* (2006.01)
*B60Q 1/00* (2006.01)

(52) U.S. Cl.
CPC .......... *B60Q 1/2696* (2013.01); *B60Q 1/0023* (2013.01)

(58) Field of Classification Search
CPC ....... B60Q 1/2696; B60Q 1/0023; B60Q 1/26
See application file for complete search history.

(56) References Cited

U.S. PATENT DOCUMENTS

| | | | | |
|---|---|---|---|---|
| 5,373,280 A | * | 12/1994 | Louy .................... | B60Q 1/2696 340/425.5 |
| 6,897,771 B1 | * | 5/2005 | Lodhie ................. | B60Q 1/2607 340/464 |
| 10,281,113 B1 | | 5/2019 | Salter et al. | |
| 2017/0313239 A1 | * | 11/2017 | Kudo ................... | B60Q 1/2607 |
| 2018/0007756 A1 | * | 1/2018 | Hong .................... | H05B 47/16 |
| 2018/0163942 A1 | | 6/2018 | Salter et al. | |
| 2018/0257558 A1 | * | 9/2018 | Berlitz .................. | B60Q 3/80 |
| 2019/0299566 A1 | * | 10/2019 | Berard ................. | B32B 17/10293 |
| 2019/0301702 A1 | * | 10/2019 | Crompvoets ............ | B60Q 1/28 |
| 2019/0331311 A1 | * | 10/2019 | Crompvoets ........... | F21S 43/14 |

FOREIGN PATENT DOCUMENTS

| | | |
|---|---|---|
| DE | 202013008321 U1 | 10/2013 |
| DE | 102017101420 A1 | 7/2017 |
| EP | 2824379 A1 | 1/2015 |
| EP | 2993384 A1 | 3/2016 |
| GB | 2517736 A | 3/2015 |

* cited by examiner

*Primary Examiner* — Donald L Raleigh
(74) *Attorney, Agent, or Firm* — Brooks Kushman P.C.

(57) ABSTRACT

A vehicle body component comprising a lighting means arrangement, which is configured as a LED strip being at least bendable in the longitudinal direction thereof and comprises a plurality of LEDs arranged one after the other and electrically interconnected; and a base body configured to receive the lighting means arrangement at a light exit side. Further disclosed is a method for manufacturing a body component and a method for controlling a lighting means arrangement on a vehicle.

23 Claims, 6 Drawing Sheets

VEHICLE BODY COMPONENT, METHOD FOR MANUFACTURING A VEHICLE BODY COMPONENT AND METHOD FOR OPERATING A LIGHTING MEANS ARRANGEMENT

CROSS-REFERENCE TO RELATED APPLICATION

This application claims priority to German Patent Application DE 202020000304.2 filed Jan. 24, 2020, the disclosure of which is hereby incorporated in its entirety by reference herein.

TECHNICAL FIELD

The present disclosure relates to a vehicle body component, a method for manufacturing the same and for operating a lighting means arrangement on a vehicle.

BACKGROUND

LED strips or LED tapes are generally known, in which LEDs are arranged one after the other. Due to their flat dimensions, voltage merely required in the low-voltage range, versatile possibilities of colored radiation and low energy consumption, these LED strips can be used flexibly.

SUMMARY

The present disclosure may describe one or more embodiments to provide illumination for a vehicle.

According to one embodiment, a vehicle body component including a lighting means arrangement, which is configured as a LED strip being bendable at least in the longitudinal direction thereof and may include a plurality of LEDs arranged one after the other and electrically interconnected; and a base body configured to receive the lighting means arrangement at a light exit side.

According to another embodiment, a method for manufacturing a vehicle body component is provided. The method may include: providing a base body configured at a light exit side to receive the lighting means arrangement; fixing a lighting means arrangement, which is configured as a LED strip being bendable at least in the longitudinal direction thereof and may include a plurality of LEDs arranged one after the other and electrically interconnected, to the base body.

According to yet another embodiment, a method for controlling a lighting means arrangement on a vehicle is provided. The method may include: providing a controller for controlling a plurality of LEDs arranged one after the other and electrically interconnected of a lighting means arrangement disposed on a base body of a vehicle body component and configured as a LED strip being bendable at least in the longitudinal direction thereof; and turning on and off the individual LEDs or modulating a radiant power thereof according to a predetermined pattern.

In one or more embodiments, an LED strip installed in a vehicle body part or integrally connected thereto may appear natural to a user by virtue of itself and may be suitable as a modern illumination means for a vehicle.

In one or more embodiments, the LED strip may be fixed to a base body of the vehicle body component. The base body may be configured so that the LED strip may be received in a flush manner by the base body. Here, the bendable property of the LED strip facilitates versatile use on different base bodies of modern body components.

The LED strip may include a plurality of LEDs (light emitting diodes) arranged one after the other and interconnected in series or in parallel, that usually may be configured as LED semiconductor chips, but may also be configured as an OLED (organic light emitting diode), for example. Hence, radiation over a large solid angle can be achieved on a light exit side.

For instance, the LEDs provided on the LED strip and may be configured as LED chips are generally interconnected so that they merely require direct current (DC) voltage in the low-voltage range for operation. As one example, the circuit is designed for the operating voltage of the power source of the vehicle, which is the voltage of the vehicle battery, usually 12 Volt, in a general vehicle.

As one example, the vehicle body component may include a mounting means configured to fix the lighting means arrangement. In this way, detachment of the LED strip from the vehicle body component can be prevented by stably fixing the same to a mounting means attached to the vehicle body component and the base body, respectively, or integrally connected to the base body. Fixing the LED strip by such a mounting means is advantageous in that it remains at the fixed position over a long period of time without partially or completely coming off from the body component. Thus, long-term use is ensured.

As another example, the base body may include at least one depression for receiving the lighting means arrangement at the light exit side. The LED strip is fixed to or integrated with the body component in the depression of the body component by a mounting means, which is disposed in the depression. In this way, the lighting means arrangement is better protected against environmental influences. Moreover, the depth of the depression may be configured to limit the solid angle of the radiated light.

In one or more embodiments, the vehicle body component may include a cover for covering the depression at the light exit side. Here, the cover has at least one at least partially transparent portion through which at least some of the light generated by the LEDs can be radiated to the outside. In order to further adjust the luminous characteristics and to protect the LED strip against environmental influences, a cover is provided across the depression, through which at least some of the generated light can be radiated to the outside through at least one transparent, partially transparent or translucent portion of the cover. In order to limit the solid angle of the radiated light, a lightproof, i.e. opaque portion may also be provided.

In one or more embodiments, the lighting means arrangement may include a substrate and an at least partially transparent outer layer. Here, the LEDs are disposed between the substrate and the outer layer. As another example, the substrate is silicon or a silicon-based or other semiconductor. In addition, a further substrate layer, for example a harder substrate, or a base plate of metal may be provided, which makes the LED strip mechanically robust.

The outer layer protects the LEDs against environmental influences. Here, the outer layer may be configured to be transparent, partially transparent or translucent so that at least some of the light generated by the LEDs can be radiated to the outside and in a solid angle having a size of up to $4\pi$. Here, the outer layer may be configured to be elastic in that the outer layer contains an elastic material, such as soft plastic. Thereby, the LEDs are better protected against mechanical impacts.

In one or more embodiments, the lighting means arrangement is configured to be bendable in all spatial directions. Such a mechanical flexibility improves the applicability of the lighting means arrangement in that the lighting means arrangement may also be formed in a helical shape or other 3D arrangement. This may be the case, for example, when it is integrated into a radiator grill exceeding a two dimensional grating structure or into body components of the paneling, which are aerodynamically optimized in three dimensions, such as a bumper, a fender or a side panel.

In one or more embodiments, the LEDs are configured as white-emitting or single-color-emitting LEDs or as RGB LEDs. Depending on a desired visual effect, this development facilitates a versatile color design of the lighting means arrangement. On the one hand, this may be used for an improved design to enhance the user experience of the driver or owner of the vehicle. On the other hand, the color design may also be used for a function, such as an indication. Thus, for example, the state of charge of a battery of an electric vehicle may be indicated by the colors of the LEDs.

In one or more embodiments, the LEDs are exclusively disposed on a front side of the lighting means arrangement. Here, the "front side" of the lighting means arrangement is defined as the side of the lighting means arrangement which, after being mounted in the base body, faces the cover and light exit side of the vehicle body component, respectively. This facilitates an uncomplicated integration into the base body of the body component by using the back side or edges of the lighting means arrangement for mounting. In general, the LEDs may be arranged on the substrate as desired, simplifying the manufacture of the lighting means arrangement even by larger positioning tolerances.

In one or more embodiments, at least two contact terminals for electrically contacting the LEDs are disposed on the front side of the lighting means arrangement. Thus, electric lines may be connected to one of the ends of the lighting means arrangement, which are generally more accessible. Thereby, contacting the lighting means arrangement is simplified.

In one or more embodiments, the respective contact terminals are disposed at an opposite end or same end of the lighting means arrangement. Thus, the electric lines may be laid from the contact terminals directly to an energy source. In this way, laying the electric lines is further simplified.

In one or more embodiments, the lighting means arrangement may include at least three LEDs, which are equidistantly arranged one behind the other on the LED strip. This also includes arrangements having more than three LEDs, in which all LEDs of the lighting means arrangement are equidistantly arranged one behind the other. The LEDs may also be arranged one behind the other in groups having the same distances, but having distances varying from group to group. With such arrangements, an outwardly acting homogenous illumination may be achieved in conjunction with the cover.

In one or more embodiments, the lighting means arrangement may include a photosensitive sensor, a Zener diode or a temperature sensor. The function of the lighting means arrangement may be better ensured and even extended by means of one of the mentioned additional components. For instance, a temperature sensor having a corresponding circuit may enable the LEDs to be automatically turned off for safety reasons in case of excessive temperature. When one LED fails, a Zener diode connected antiparallel to the LEDs may cause the functionality of a LED series connection to the remaining LEDs to be maintained. For example, a photosensitive sensor facilitates automatically turning on or off the LEDs according to an ambient light.

In one or more embodiments, a controller for controlling the LEDs is provided, which is coupled to the LEDs so that the LEDs can be turned on and off independently of each other. Thus, the controller facilitates individually driving the LEDs, which may be used for further visual effects. So, the LEDs may be turned on and off according to a temporal pattern, for example, which may be used specifically to enhance the user experience, but also to indicate a signal function or warning function. Like a modern turn-signal indicator, a direction can be indicated by sequentially turning on the LEDs, which are arranged one after the other or arranged one behind the other on the LED strip. Here, any operation modes, also called patterns in this context, of turning on and off the LEDs are conceivable. They may also be used for communication purposes, in which the LEDs are turned on and off according to a code. In this way, codes, such as error codes, giving information about a state of vehicle components, such as a battery in an electric vehicle, can be easily transmitted. Combinations of the above mentioned functions are also conceivable.

As another example, a radiant power of the LEDs can be controlled independently of each other by the controller. Thereby, a further functionality of the LED strip is provided, which, like the previous development, may be used in many ways. For instance, changes in the radiant power of the individual LEDs may be used for a visually attractive design, and consequently for an enhanced user experience. A change in illumination, which has usually been performed in stages and therefore appears to be "jolty", may be avoided by temporally changing the radiant power and, in particular, by continuously changing the radiant power, such as performing the attenuation or boost of the radiant power "slowly". As a matter of course, changes in the radiant power may analogously also be used for warning and display functions.

In one or more embodiments, the lighting means arrangement is integrally fixed to the mounting means. With this development, fixing the lighting means arrangement to the base body is configured for long-term use. Here, an integral accommodation into the mounting means provides a fastening option designed for safety.

In one or more embodiments, the base body and the cover are formed as one part or one piece. Such a formation involves less effort and hence lower costs in manufacturing, as for example by injection molding, where the lighting means arrangement is already integrated into the component at time of manufacture.

In one or more embodiments, the lighting means arrangement is fixed to the mounting means as a separate component. This allows simplified replacement of the lighting means arrangement, which may become necessary due to a failure of the lighting means arrangement, for example. Nevertheless, fixing the lighting means arrangement to the base body may be configured for long-term use.

In one or more embodiments, an outer surface of the cover at the light exit side is formed to be flush with a surface of the base body surrounding the depression. Thus, this gives rise to a smooth surface without edges or steps between the respective surfaces of the base body and the cover. Thereby, on the one hand, an illumination having a particularly natural appearance is achieved. In this way, on the other hand, when illumination is turned off, the integrated lighting means arrangement is not visible or only hardly visible. Therefore, the vehicle body component also appears natural, when illumination is turned off.

In one or more embodiments, the lighting means arrangement is fixed to the mounting means by at least one of the following options: extruding, injection molding, gluing, locking, clip-fastening, welting, clamping. With this development, fixing the lighting means arrangement to the base body is configured for long-term use. Here, these options for fastening the lighting means arrangement to the mounting means also provide for secure fastening. In particular, locking, clip-fastening, welting and clamping enable simple replacement of the lighting means arrangement.

In one or more embodiments, the at least one at least partially transparent portion of the cover has a transmittance of a predetermined spectral range or a predetermined color. The spectrally selective configuration, that may be in accordance with a color, of the at least partially transparent portion of the cover may be advantageous in terms of costs compared to a configuration of the LEDs according to a desired spectral property. Furthermore, light of a certain range of the spectrum may be prevented from leaking to the outside, which may be a safety-related advantage.

In one or more embodiments, the at least one portion of the cover, which is at least partially transparent, is configured as a lens. Thus, further optical effects are enabled, such as beam focusing or widening, selective emission at a predetermined solid angle or the like, which may be used for an increased user experience, a warning function or a display function.

In one or more embodiments, the vehicle body component is configured as radiator grill. Moreover, the lighting means arrangement is fixed to a rib of a grating of the radiator grill or to at least one side wall of the radiator grill. By means of the depression and the integration of the lighting means arrangement into a rib of the radiator grill associated therewith, an illumination may be achieved that is highly visible from the outside. By mounting the lighting means arrangement into a depression formed at a side wall of the radiator grill, a highly effective illumination of the radiator grill structure may be achieved.

Here, "viewed from the outside" means viewing from a position that the viewer takes, when he or she is in front of, behind or next to the vehicle, so that he or she has an unobstructed view of the body component.

In one or more embodiments, a step of fixing a cover for covering a depression of the base body provided to receive the lighting means device is provided, the cover comprising at least one at least partially transparent portion.

The above embodiments and developments may be combined with each other, if reasonable. Specifically, all features of the body component are applicable to the method for manufacturing the body component and operating a lighting means arrangement of a vehicle. Further possible embodiments, developments and implementations of the invention also comprise not explicitly stated combinations of features of the invention mentioned above or below with regard to the exemplary embodiments. In particular, in so doing, a person skilled in the art will add individual aspects as improvements or additions to the respective basic form of the present invention.

BRIEF DESCRIPTION OF THE DRAWINGS

Hereinafter, the present invention is described in more detail with reference to the exemplary embodiments shown in the schematic figures of the drawings, in which.

DETAILED DESCRIPTION

Figure 1:
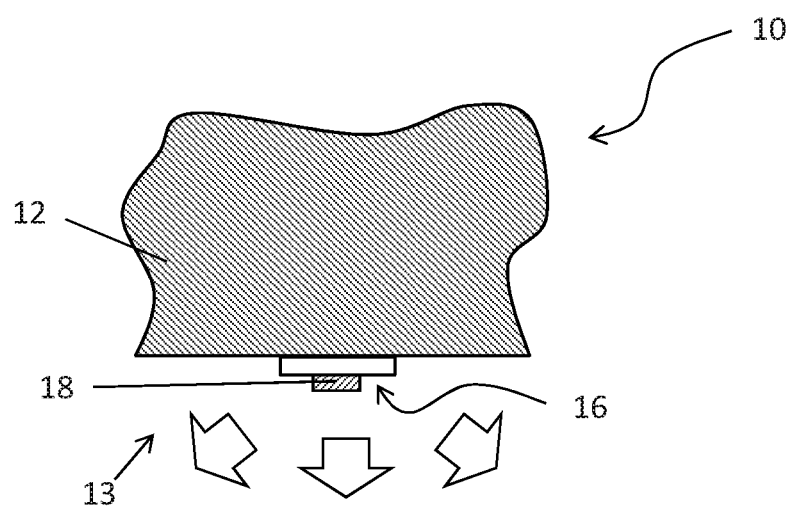
FIG. 1 is a schematic cross-sectional view of a detail of an embodiment of a vehicle body component.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The accompanying drawings are intended to provide a further understanding of the embodiments of the invention. They illustrate embodiments and serve in conjunction with the specification to explain principles and concepts of the invention. Other embodiments and many of the mentioned advantages will become apparent in view of the drawings. The elements in the drawings are not necessarily shown true to scale to each other.

Throughout the figures of the drawings, identical, functionally identical and identically acting elements, features and components are respectively designated by the same reference numerals, unless stated otherwise.

FIG. 1 is a schematic cross-sectional view of a detail of an embodiment of a vehicle body component.

The detail of a vehicle body component 10, which is specifically a radiator grill or a bumper strip of a vehicle, shown in FIG. 1, includes a base body 12 configured to receive the lighting means arrangement 16. A lighting means arrangement 16, which is configured as an LED strip being bendable at least in the longitudinal direction thereof, is fixed to the surface of the base body 12. As a result of being bendable in at least the longitudinal direction, the LED strip can be used flexibly. Here, the LED strip has a plurality of LEDs 18 arranged one after the other and electrically interconnected. Hence, radiation over a large solid angle can be achieved on a light exit side 13.

Figure 2:
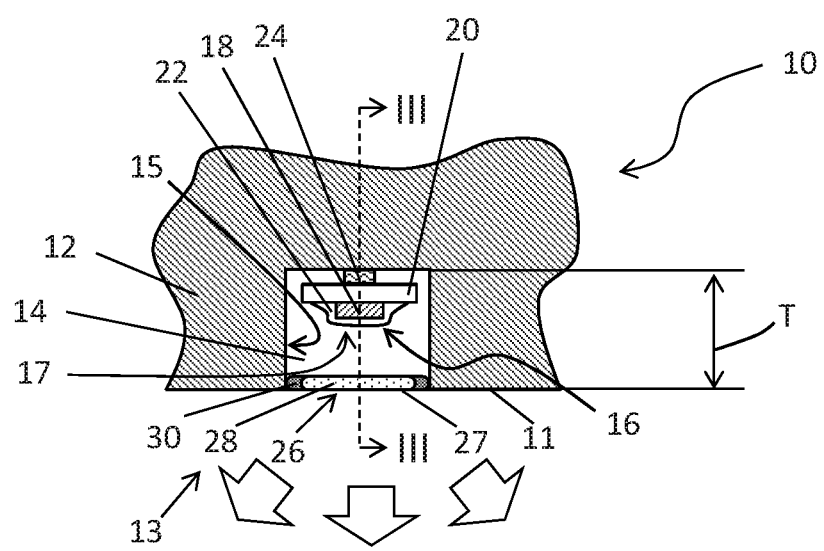
FIG. 2 is a schematic cross-sectional view of a detail of an embodiment of a vehicle body component.

FIG. 2 is a schematic cross-sectional view of a detail of an embodiment of a vehicle body component.

The detail of a vehicle body component 10 shown in FIG. 2 includes a base body 12, which may include at least one recess or depression 14 for receiving a lighting means arrangement 16 at the light exit side 13. Here, the depth T and the length of the depression 14 may be adapted to the dimensions of the lighting means arrangement 16 as well as adjusted in accordance with the radiation characteristics of the lighting means arrangement.

Here, the lighting means arrangement 16 is configured as a LED strip being bendable at least in the longitudinal direction thereof. The LED strip may include a plurality of LEDs 18 arranged one behind the other and electrically interconnected.

Here, as shown in FIGS. 1 and 2, the LEDs 18 may be disposed on a front side 17 of the lighting means arrangement 16. The "front side 17" of the lighting means arrangement 16 is here defined as the side of the lighting means arrangement 16 that, after being mounted in the base body 12, faces to the light exit side 13 and a cover 26 of the vehicle body component 10, respectively. In this way, an uncomplicated integration to or into the base body of the body component is enabled, in which the back side or the edges of the lighting means arrangement 16 may be used for mounting. Therefore, the radiated light can practically not be blocked by mounting. Moreover, the manufacturing process is significantly simplified by arranging the LEDs 18 on one side of the lighting means arrangement 16.

Here, the LED strip may include at least one substrate 20, which may generally include silicone or a silicon-based or other semiconductor. In addition, a further substrate layer, for example a harder substrate, or a base plate of metal may be provided, which makes the LED strip mechanically robust. An insulation layer may be provided between the two layers.

Moreover, the body part 10 may include a mounting means 24, which is disposed in the depression 14 of the base body 12. Here, the mounting means 24 is configured to fix the lighting means arrangement 16. Thus, fixing the lighting means arrangement 16 to the base body 12 may be configured for long-term use. However, the lighting means arrangement 16 may be fixed in different ways. For instance, the lighting means arrangement 16 may be integrally fixed or connected to the mounting means 24. Therefore, an integral fixation in the mounting means 24 provides a fastening option designed for safety. Alternatively, the mounting means 24 may be configured as a separate component. The lighting means arrangement 16 may be fixed to the mounting means 24 by at least one of the following options: extruding, injection molding, gluing, locking, clip-fastening, welting or clamping. These options may also be combined with each other. Thus, secure fastening may be realized, which additionally may allow simple replacement of the illumination means arrangement.

Furthermore, the body component 10 may include the cover 26 configured to cover the depression 14. Here, the cover 26 includes at least one portion 28, which is configured to be transparent, partially transparent or translucent so that at least some of the light generated by the LEDs 18 can be radiated to the outside. As shown in FIG. 1, the cover may also include a non-transparent, i.e. opaque portion 30. For instance, in the present embodiment, the at least partially transparent region is centrically disposed on the cover 26, wherein the opaque portion 30 forms the outer edge of the cover 26. However, it is also conceivable that light is radiated in predetermined sings or symbols by a corresponding design of the portions 28 and 30. In addition, the cover 26 may be configured so that the at least one at least partially transparent portion 28 of the cover 26 has a transmittance of a predetermined spectral range or a predetermined color. The spectrally selective configuration, such as a color, of the at least partially transparent portion 28 of the cover 26 may be advantageous in terms of costs compared to a configuration of the LEDs 18 according to a desired spectral property. Furthermore, light of a certain range of the spectrum may be prevented from leaking to the outside, which may be a safety-related advantage.

As an example, the base body 12 and the cover 26 are formed as one part or one piece. In such a case, the lighting means arrangement 16 may already be integrated into the base body at the time of manufacturing the same. Thereby, the manufacturing process, for example by injection molding, is simplified, whereby costs can be reduced. Furthermore, an outer surface 27 of the cover 26 at the light exit side 13 may be formed to be flush with a surface 11 of the base body 12 surrounding the depression 14. Thus, this gives rise to a smooth surface without edges and steps between the respective surfaces 11, 27 of the base body 12 and the cover 14. Thereby, on the one hand, an illumination having a particularly natural appearance is achieved. In this way, on the other hand, when illumination is turned off, the integrated lighting means arrangement is not visible or only hardly visible. Therefore, the vehicle body component also appears natural, when illumination is turned off.

Moreover, the lighting means arrangement 16 may include an at least partially transparent outer layer 22, wherein the LEDs 18 are disposed between the substrate 20 and the outer layer 22. Here, the outer layer 22 is configured to be transparent, partially transparent or translucent so that at least some of the light generated by the LEDs can be radiated to the outside and in a solid angle having a size of up to 4π. Here, the outer layer may be made elastic in that the outer layer 22 contains an elastic material, such as soft plastic. Thereby, the LEDs 18 are better protected against mechanical impacts. Moreover, the outer layer 22 protects the LEDs 18 against environmental influences. The outer layer may extend across the entire surface of the substrate 20 or may extend, as shown in FIG. 1, merely across a part of the cross section of the lighting means arrangement 16 thereof. The outer layer 22 may also be interrupted so that it only covers the LEDs 18 and optionally conductor paths connecting the LEDs 18 to each other in accordance with a circuit (not shown).

As an additional aspect, the configuration of the depression 14 in terms of the length L and particularly the depth T thereof allows to adjust the light generated by and radiated from the LEDs 18 according to desired outwardly acting luminous characteristics at the light exit side 13. Since the LEDs 18 usually radiate over a relatively large solid angle, the radiation angle of the light may be limited, for example, by increasing the depth T of the depression 14. The solid angle may be further reduced by configuring the walls 15 of the depression 14 to absorb light. Vice versa, a small depth T of the depression 14 and reflective walls 15 of the depression 14 increase the solid angle of the radiated light.

Figure 3:
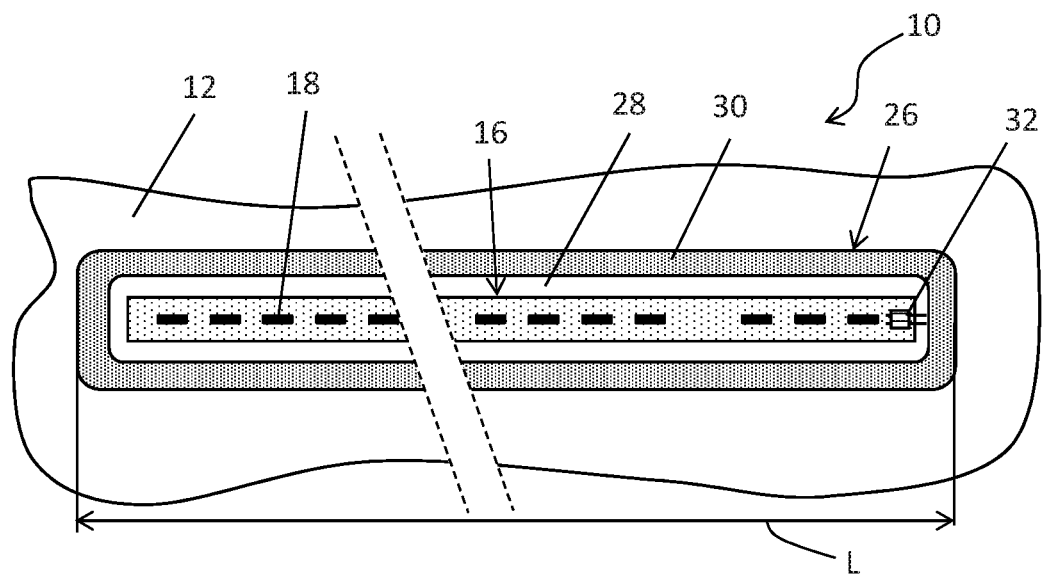
FIG. 3 is a schematic plan view of a detail of an embodiment of a vehicle body component.

FIG. 3 is a schematic plan view of a detail of an embodiment of a vehicle body component.

The lighting means arrangement 16 shown in FIG. 3 has a length L that may correspond to a dimension of the depression 14 of the base body 12. The lighting means arrangement 16 may include at least three LEDs 18, that may be equidistantly arranged one behind the other on the LED strip. Moreover, as shown in FIG. 3, the LEDs 18 may be equidistantly arranged in groups of three, four, five or more LEDs 18 one behind the other. Arrangements of groups of 18 LEDs 18 arranged one behind the other at varying distances are also conceivable. With such arrangements, an outwardly acting homogenous illumination may be achieved in conjunction with the cover. In general, the LEDs 18 may practically be arranged on the substrate 20 as desired, simplifying the manufacture specifically in terms of manufacturing tolerances.

Furthermore, in FIG. 3 it can be seen that at least two contact terminals 32 for electrically contacting the LEDs 18 are disposed on the front side 17 of the lighting means arrangement 16. Here, the contact terminals 32 may be, and as shown in FIG. 3, arranged at one end of the lighting means arrangement 16. Thus, electric lines may be connected to one of the ends of the lighting means arrangement 16, which are generally more accessible. Thereby, contacting the lighting means arrangement 16 and manufacturing the same are simplified.

Moreover, it can be seen that the at least partially transparent portion 28 of the cover 26 is entirely surrounded by the opaque portion 30. Thereby, the solid angle of the radiated light is limited. Additionally, the solid angle may be limited or even increased in that the at least one at least partially transparent portion 28 of the cover 26 is formed as an optical element, such as a lens. In this case, the type and shape of the lens are not limited and may include, inter alia, convex lenses, concave lenses, convexo-concave lenses, meniscus lenses, axicons, and in particular cylindrical lenses of the mentioned shapes particularly suitable for the embodiment of FIG. 3, but are not limited thereto. The lens may also be configured as a lens having a variable focus, which changes or adjusts the optical characteristics thereof, such as the focal distance thereof, in accordance with a signal from, for example, a sensor described further below.

Figure 4:
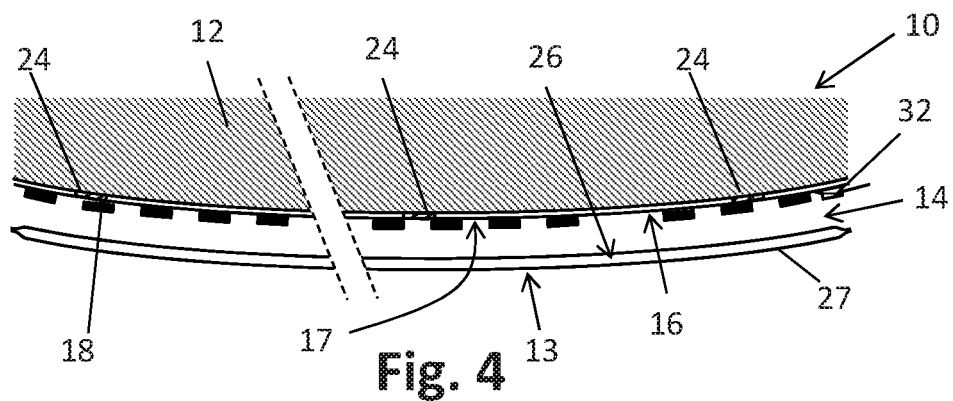
FIG. 4 is a schematic cross-sectional view according to the section III of the embodiment of a vehicle body component of FIG. 3.

FIG. 4 is a schematic cross-sectional view according to the section III of a detail of the embodiment of a vehicle component of FIG. 3.

It can be seen that the lighting means device 16 is disposed in the correspondingly formed depression 14 in a state of being bent along the longitudinal direction. As shown in the following figures, the bending shown is basically not limited to the bending direction along the longitudinal direction of the lighting means arrangement 16.

In FIG. 4, it can be seen that the mounting means 24 is provided at three positions along the depression 14. Therefore, in this embodiment, the lighting means arrangement 16 is fixed to the base body 12 at three positions. The number of three mounting means 24 may vary if necessary. For instance, in case of an arrangement that is not bent, i.e. straight of the lighting means arrangement 16, just a single mounting means 24 may be sufficient. In case of a stronger bending of the lighting means arrangement 16, correspondingly more mounting means 24 are required. Mounting means 24 having an elongated shape along the lighting means arrangement 16 are also conceivable. As already mentioned, the lighting means arrangement 16 may be fixed or connected to the mounting means 26 in an integral manner or as a separate component and by extruding, injection molding, gluing, locking, clip-fastening, welting or clamping, or combinations thereof.

Figure 5:
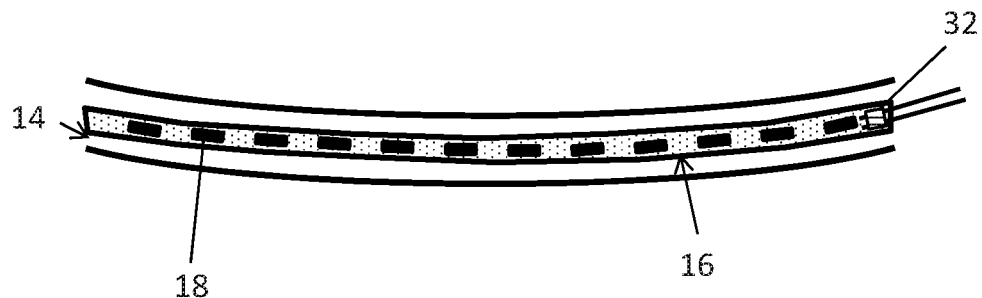
FIG. 5 is a schematic plan view of an embodiment of a lighting means arrangement of a vehicle body component.

FIG. 5 is a schematic plan view of an embodiment of a lighting means arrangement of a vehicle body component.

In the embodiment of the lighting means arrangement 16 shown in FIG. 5, all LEDs 18 of the lighting means arrangement 16 are arranged at equal distances. Thereby, a particular homogenous illumination is achieved for a viewer from the outside.

Moreover, in this embodiment, the lighting means arrangement 16 is also bent along the width thereof, which may be enabled, for example, by a flexible configuration of the substrate 20 or by a substrate body 20 having a greater thickness. Thus, the lighting means arrangement 16 may be configured in general so that the lighting means arrangement 16 is configured to be bendable in all spatial directions.

Figure 6:
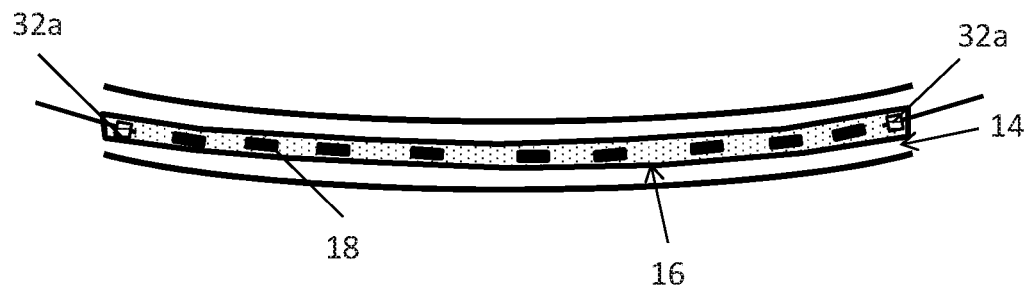
FIG. 6 is a schematic plan view of a further embodiment of a lighting means arrangement of a vehicle body component.

FIG. 6 is a schematic plan view of a further embodiment of a lighting means arrangement of a vehicle body component.

In this embodiment, the LEDs 18 are arranged at any distances. If necessary, this may also be desired. Moreover, the contact terminals 32a, 32b are arranged at opposite ends of the lighting means arrangement 16. This may also be desired according to the conditions of the vehicle body part 10. As a matter of course, a circuit connecting the LEDs 18 to each other needs to be adjusted.

Figure 7:
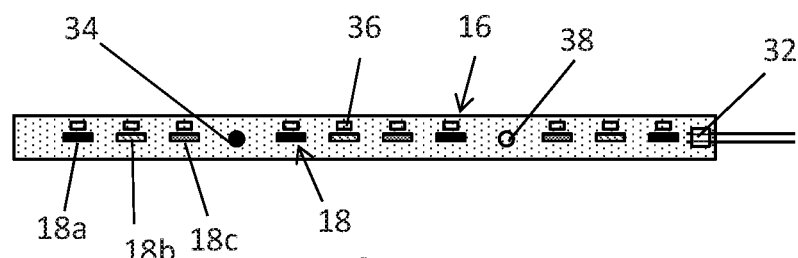
FIG. 7 is a schematic plan view of a further embodiment of a lighting means arrangement of a vehicle body component.

FIG. 7 is a schematic plan view of a further embodiment of a lighting means arrangement of a vehicle body component.

In FIG. 7, the LEDs 18 are configured differently in three different variations. The LEDs 18 may be configured as white-emitting or color-emitting LEDs 18. They may also be configured as RGB-LEDs 18a, 18b, 18c, as just indicated in FIG. 7 by the monochrome depiction. Depending on a desired visual effect, this facilitates a versatile color design of the lighting means arrangement 16. In this way, this design may be used for an improved design to enhance the user experience. Alternatively, the color design may be used for a display function, such as display of a warning. For example, the state of charge of a battery of an electric vehicle may also be indicated by the colors of the LEDs 18.

Besides the LEDs 18, the lighting means arrangement 16 may also comprise further electronic components. For instance, the lighting means arrangement shown in FIG. 7 may include a photosensitive sensor 34, a Zener diode 36 and a temperature sensor 38. The function of the lighting means arrangement 16 may be better ensured, even extended, by means of the additional electronic components 34, 36, 38. For instance, a temperature sensor 38 having a corresponding circuit may enable the LEDs 18 to be automatically turned off for safety reasons in case of excessive temperature. When one LED fails, a Zener diode 36 connected antiparallel to the LEDs 18 may cause the functionality of a LED series connection to the remaining LEDs 18 to be maintained. A photosensitive sensor 34 facilitates automatically turning on or off the LEDs 18 according to an ambient light.

In the following FIGS. 8 to 10, operation modes, here also called patterns, of the lighting means arrangement 16 are presented, which are provided by a controller 40 for controlling the LEDs 18 and coupled to the LEDs 18 so that the LEDs 18 can be turned on and off independently of each other. Here, the controller 40 is not limited to the patterns presented herein merely by way of example. In fact, besides controlling further patterns, the controller 40 may also be configured so that a radiant power of the LEDs 18 can be controlled independently of each other by the controller 40.

Figure 8:
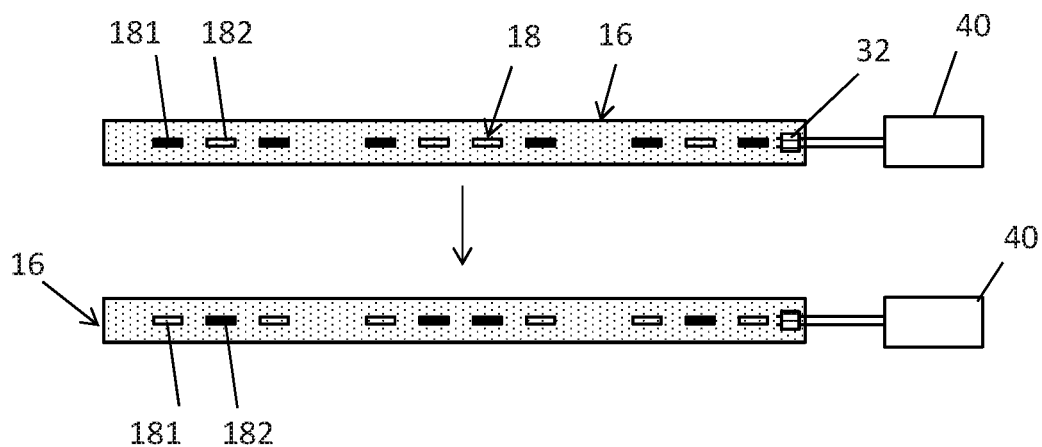
FIG. 8 is a schematic plan view of a further embodiment of a lighting means arrangement of a body component and an operation thereof.

FIG. 8 is a schematic plan view of a further embodiment of a lighting means arrangement of a vehicle body component and an operation thereof.

In the operation mode shown in FIG. 8, selected LEDs 18 are alternately turned on and off one after the other. First, a first selection 181 of LEDs is turned on, whereas a second selection 182 of LEDs 18 remains turned off. After a predetermined period of time, the first selection 181 of LEDs 18 is turned off, whereas the second selection 182 of LEDs 18 is turned on. Here, the selection of LEDs may be as desired.

Figure 9:
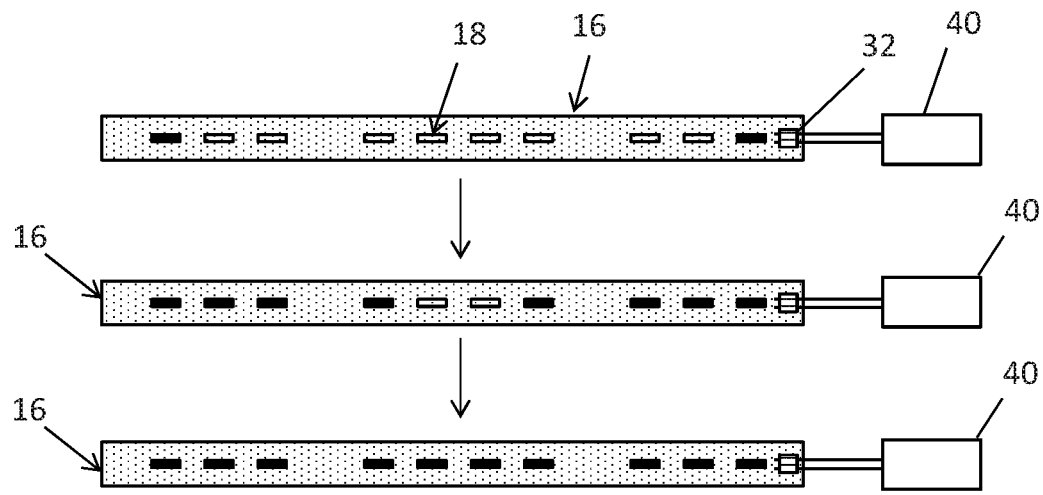
FIG. 9 is a schematic plan view of a further embodiment of an operation of a lighting means arrangement.

FIG. 9 is a schematic plan view of a further embodiment of an operation of a lighting means arrangement.

In the operation mode shown in FIG. 9, a spatial pattern is realized. So, first, only the LEDs 18 placed at the outer end of the lighting means arrangement 16 are turned on, whereas the remaining LEDs 18 remain turned off (top state of FIG. 8). Then, after a predetermined period of time, the respectively next inner LEDs 18 on both sides are additionally turned on, whereas the remaining LEDs 18 are not switched (middle state). Finally, in a final state, all LEDs 18 of the lighting means arrangement 16 are turned on (bottom state). This pattern as well as all following patterns may repeat over time.

Figure 10:
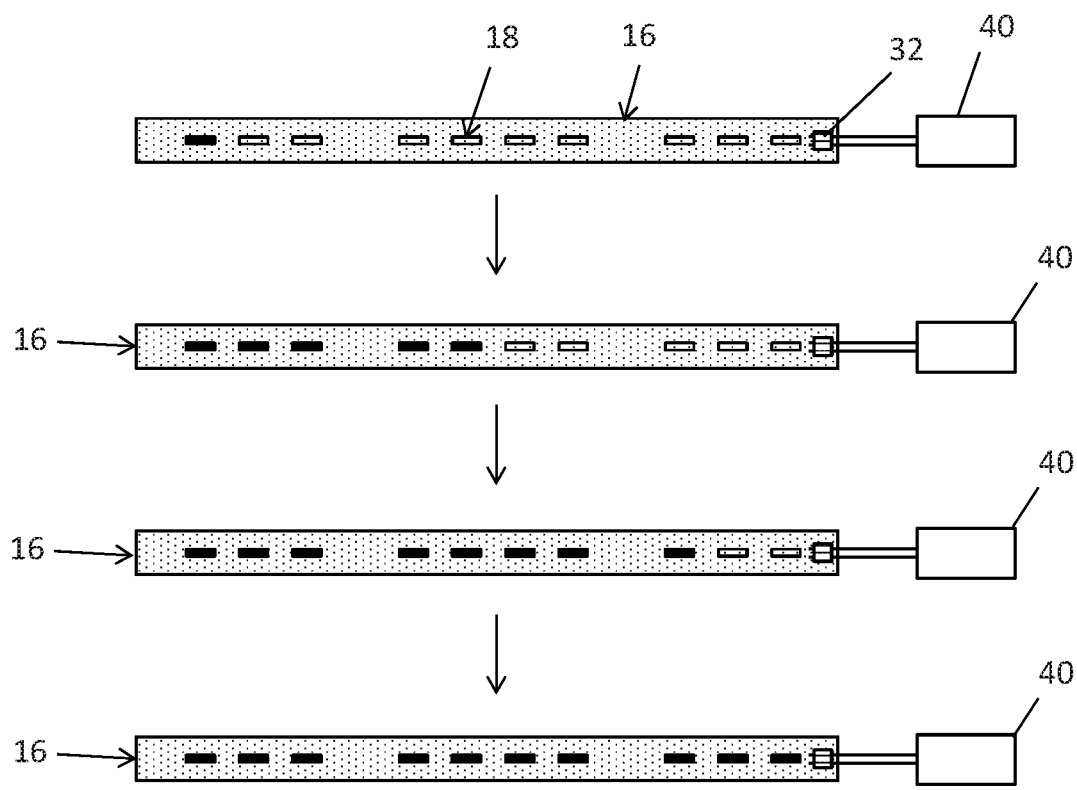
FIG. 10 is a schematic plan view of a further embodiment of an operation of a lighting means arrangement.

FIG. 10 is a schematic plan view of a further embodiment of an operation of a lighting means arrangement.

In the operation mode of the lighting means arrangement 16 shown in FIG. 10, the LEDs 18 are switched by the controller 40 so that a direction is indicated. Thus, on the upper picture, merely one of the outer LEDs 18, i.e., in the figure, the LED 18 positioned in the leftmost position, is turned on (top state in FIG. 10). After a predetermined period of time, the next LED on the right is turned on, until finally all LEDs 18 are turned on (bottom state of FIG. 10). Thus, this operation mode may for example be used as direction indicator in addition to the present turn-signal indicators already provided at the vehicle, thereby increasing traffic safety.

Figure 11:
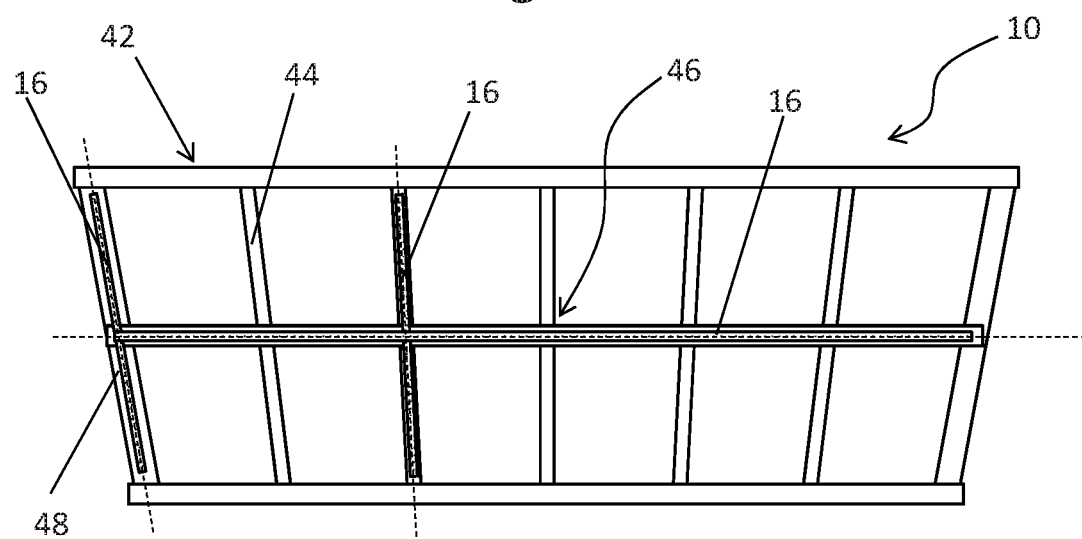
FIG. 11 is a schematic diagram of an embodiment of a vehicle body component.

FIG. 11 is a schematic diagram of an embodiment of a vehicle body component.

In FIG. 11, a vehicle body component 10 configured as radiator grill 42 is shown. The broken lines indicate positions of the radiator grill 42 at which it is conceivable to dispose the lighting means arrangement 16. For instance, the lighting means arrangement 16 may be disposed at a rib 44 of the grating 46 of the radiator grill 42, or at a side wall of the radiator grill 42. Here, the lighting means arrangement 16 may be received in a depression 14 formed at the stated positions of the radiator grill 44. As an example, the lighting means arrangement 16 received in the depression 14 is covered by a cover 26 having a partially transparent portion 28. Thus, by means of the reception of the lighting means arrangement 16 in the depression 14 and the associated integration thereof into a rib 44 of the radiator grill, for example, an illumination may be achieved that is highly visible, when viewed from the outside. Alternatively or additionally, the lighting means arrangement 16 may be disposed on at least one side wall 48 of the radiator grill 42. By disposing the lighting means arrangement 16 on a side wall 48 of the radiator grill 42, a highly effective illumination 16 of the radiator grill structure may be achieved.

Figure 12:
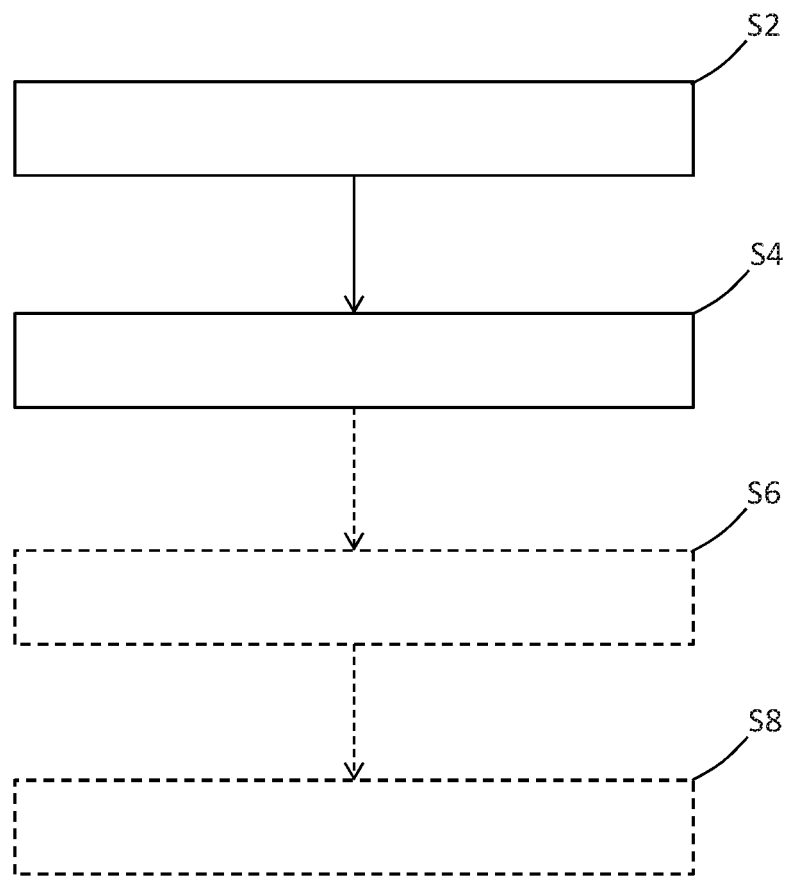
FIG. 12 is a schematic diagram of an embodiment of a method for manufacturing a vehicle body component.

FIG. 12 is a schematic diagram of an embodiment of a method for manufacturing a vehicle body component.

The method for manufacturing a body component 10 shown in FIG. 12 includes step (S2) of providing a base body 12 configured to receive a lighting means arrangement 16. In a next step (S4), fixing a lighting means arrangement 16, which is configured as a LED strip being bendable in at least the longitudinal direction thereof and may include a plurality of LEDs 18 arranged one after the other and electrically interconnected, to the base body 12 is performed. This is followed by an optional step (S6) of fixing a cover 26 for covering the depression 14 in the base body 12, the cover comprising at least one at least partially transparent portion 28. Finally, the optional step (S8) of turning on the illumination device 16 is performed, wherein light emitted by the LEDs 18 of the lighting means arrangement 16 is radiated to the outside through the at least partially transparent portion 28.

Figure 13:
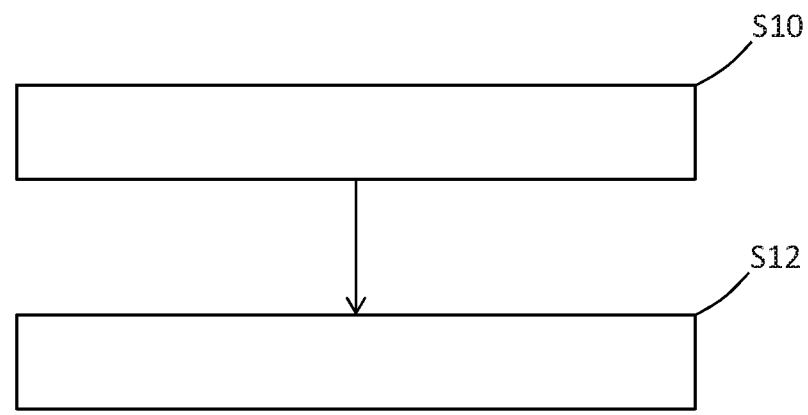
FIG. 13 is a schematic diagram of an embodiment of a method for operating a lighting means arrangement of a vehicle body component.

FIG. 13 is a schematic diagram of an embodiment of a method for operating a lighting means arrangement of a body component.

The method for operating a lighting means arrangement 16 on a vehicle shown in FIG. 13 includes step (S10) of providing a controller 40 for controlling a plurality of LEDs 18 arranged one after the other and electrically interconnected of a lighting means arrangement 16 fixed to a base body 12 of a body component 10, in particular a radiator grill 42, and configured as a LED strip being bendable at least in the longitudinal direction thereof. The next step (S12) may include turning on and off the individual LEDs or modulating a radiant power thereof according to a predetermined pattern.

Although the present invention has been fully described heretofore by means of preferred exemplary embodiments, it is not limited thereto, but can be modified in many ways.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

10 vehicle body component
11 base body surface
12 base body
13 light exit side
14 depression
15 depression wall
16 lighting means arrangement
17 front side of the lighting means arrangement
18, 18a, 18b, 18c LED
20 substrate
22 outer layer
24 mounting means
26 cover
27 outer surface of the cover
28 partially transparent portion of the cover
30 opaque portion of the cover
32, 32a, 32b contact terminals
34 photosensitive sensor
36 Zener diode
38 temperature sensor
40 controller
42 radiator grill
44 rib
46 grating
48 side wall of the radiator grill
181 first selection of LEDs
182 second selection of LEDs
S1-S12 method steps While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

The invention claimed is:

1. A vehicle body component comprising:
a lighting means arrangement formed by a LED strip, wherein the LED strip is bendable at least in a longitudinal direction thereof and includes a plurality of LEDs electrically interconnected and arranged one after another;
a base body configured to receive the LED strip at a light exit side of the vehicle body component, wherein the base body comprises a depression configured to receive the entire LED strip at the light exit side, wherein the depression comprises a bottom, side walls and an open top at the light exit side, wherein the entire LED strip is disposed within the depression, between the side walls and below the open top; and
a mounting means configured to fix the lighting means arrangement to the base body.

2. The vehicle body component of claim 1, wherein the lighting means arrangement is integrally fixed to the mounting means.

3. The vehicle body component of claim 1, wherein the lighting means arrangement is fixed to the mounting means as a separate component.

4. The vehicle body component of claim 1, wherein the vehicle body component includes a cover configured to cover the depression, wherein the cover includes at least one portion, wherein the at least one portion is at least partially transparent so that at least a portion of light generated by the LEDs is radiated through the at least one portion to the outside.

5. The vehicle body component of claim 4, wherein the lighting means arrangement includes a substrate, wherein the LEDs are disposed between the substrate and an outer layer of the cover.

6. The vehicle body component of claim 1, wherein the lighting means arrangement is configured to be bent in all spatial directions.

7. The vehicle body component of claim 1, wherein the plurality of LEDs are either white-emitting LEDs, or single-color-emitting LEDs, or RGB LEDs.

8. The vehicle body component of claim 1, wherein the plurality of LEDs are exclusively disposed on a front side of the lighting means arrangement.

9. The vehicle body component of claim 1, further comprising at least two contact terminals each configured to electrically contact the plurality of LEDs disposed on a front side of the lighting means arrangement.

10. The vehicle body component of claim 9, wherein the at least two contact terminals include a first contact terminal and a second contact terminal, wherein the first contact terminal is disposed on a first end of the lighting means arrangement and the second contact terminal is either disposed on the first end or a second end of the lighting means arrangement, wherein the second end is opposite the first end.

11. The vehicle body component of claim 1, wherein the plurality of LEDs includes at least three LEDs equidistantly arranged one behind the other on the LED strip.

12. The vehicle body component of claim 1, wherein the lighting means arrangement includes a photosensitive sensor, a Zener diode, or a temperature sensor.

13. The vehicle body component of claim 1, further comprising a controller coupled to the plurality of LEDs and configured to control the plurality of LEDs to turn each of the LEDs of the plurality of LEDs on and off independently of each other.

14. The vehicle body component of claim 13, wherein the controller is configured to independently control radiant power of each the LEDs of the plurality of LEDs.

15. The vehicle body component of claim 4, wherein the base body and the cover are integrally formed to one another.

16. The vehicle body component of claim 4, wherein an outer surface of the cover disposed on the light exit side is formed so that the outer surface of the cover is flush with a surface of the base body surrounding the depression.

17. The vehicle body component of claim 4, wherein the lighting means arrangement is fixed to the mounting means by at least one of the following options: extruding, injection molding, gluing, locking, clip-fastening, welting, clamping.

18. The vehicle body component of claim 4, wherein the at least one portion of the cover has a transmittance of a predetermined spectral range or a predetermined color.

19. A vehicle body component of claim 4, wherein the at least one portion of the cover is a lens.

20. The vehicle body component of claim 1, further comprising:
a radiator grill provided with a grating including a number of side walls and a number of ribs, wherein a side wall of the number of side walls defines a first depression or a rib of the number of ribs defines a second depression, or the side wall defines the first depression and the rib defines the second depression, wherein the side wall or the rib or both form the base body; and
a number of covers each arranged to cover the first depression, the second depression, or both, wherein the lighting means arrangement is disposed in the first depression, or the second depression, or both, wherein each of the covers are at least partially transparent so that at least a portion of light generated by the LEDs is radiated through at least one cover of the number of covers.

21. A method of manufacturing a vehicle body component comprising:
providing a base body configured at a light exit side of the vehicle body component to receive a lighting means, arrangement formed by a LED strip, wherein the base body comprises depression a depression configured to receive the entire LED strip at the light exit side, wherein the depression comprises a bottom, side walls and an open top at the light exit side, wherein the entire LED strip is disposed within the depression, between the side walls and below the open top; and
fixing the lighting means arrangement, formed by the LED strip, wherein the LED strip is bendable in a longitudinal direction thereof and including a plurality of LEDs electrically interconnected and arranged one after another, to the base body by a mounting means.

22. The method of claim 21, further comprising fixing a cover configured to cover a depression defined by the base body and configured to receive the lighting means arrangement, wherein the cover includes at least one portion, wherein the at least one portion is at least partially transparent.

23. A vehicle body component comprising:
a lighting means arrangement formed by a LED strip, wherein the LED strip is bendable at least in a longitudinal direction thereof and includes a plurality of LEDs electrically interconnected and arranged one after another;

a base body comprising a depression for receiving the entire LED strip at a light exit side of the vehicle body component, wherein the depression comprises a bottom, side walls and an open top at the light exit side, wherein the entire LED strip is disposed within the depression, between the side walls and below the open top, and wherein the entire LED strip is fixed to the base body by a mounting means; and a controller configured to modulate radiant power of each of the individual LEDs of the plurality of LEDs by continuously changing the radiant power according to a predetermined pattern.

\* \* \* \* \*